US011223659B2

(12) United States Patent
Ham et al.

(10) Patent No.: US 11,223,659 B2
(45) Date of Patent: *Jan. 11, 2022

(54) BROADCAST NOTIFICATIONS USING SOCIAL NETWORKING SYSTEMS

(71) Applicant: International Business Machines Corporation, Armonk, NY (US)

(72) Inventors: John Ham, San Francisco, CA (US); Matthew Schlicht, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/704,613

(22) Filed: Sep. 14, 2017

(65) Prior Publication Data

US 2018/0007092 A1    Jan. 4, 2018

Related U.S. Application Data

(63) Continuation of application No. 14/329,848, filed on Jul. 11, 2014, now Pat. No. 9,813,457, which is a (Continued)

(51) Int. Cl.
*H04L 29/06* (2006.01)
*H04L 12/18* (2006.01)
*H04L 12/58* (2006.01)

(52) U.S. Cl.
CPC ...... *H04L 65/1066* (2013.01); *H04L 12/1859* (2013.01); *H04L 51/32* (2013.01)

(58) Field of Classification Search
CPC .. H04L 65/1066; H04L 12/1859; H04L 51/32
(Continued)

(56) References Cited

U.S. PATENT DOCUMENTS 5,438,355 A   8/1995 Palmer
5,721,583 A   2/1998 Harada et al.
(Continued)

OTHER PUBLICATIONS

Office Action (dated Jul. 12, 2015) for U.S. Appl. No. 14/329,848, filed Jul. 11, 2014.
(Continued)

*Primary Examiner* — Joseph L Greene
(74) *Attorney, Agent, or Firm* — Schmeiser, Olsen & Watts, LLP; Anthony V England

(57) ABSTRACT

A method and notification system for notifying broadcast streams to multiple users. A notifier receives, from a broadcaster, a request to notify a broadcast stream to the multiple users. The notifier receives preferences from a subset of users of two or more social networking systems. The preferences identify: (i) some but not all social networking systems of the two or more social networking systems which should send notifications about the broadcast stream to the subset of users; and (ii) times during which the notifications about the broadcast stream should be sent to the subset of users. The notifier instructs an agent representing a broadcaster in each social networking system of only the some social networking systems to send notifications about the broadcast stream to the subset of users at the times identified in the preferences.

20 Claims, 6 Drawing Sheets

Related U.S. Application Data continuation of application No. 12/949,525, filed on Nov. 18, 2010, now Pat. No. 8,819,134.

(60) Provisional application No. 61/263,196, filed on Nov. 20, 2009.

(58) Field of Classification Search
USPC .......................................................... 709/204
See application file for complete search history.

(56) References Cited

U.S. PATENT DOCUMENTS

| | | | |
|---|---|---|---|
| 5,880,720 A | | 3/1999 | Iwafune et al. |
| 6,507,589 B1* | | 1/2003 | Ramasubramani ..... H04L 12/66 370/401 |
| 7,036,083 B1 | | 4/2006 | Zenith |
| 7,103,903 B1 | | 9/2006 | Kydd |
| 7,213,005 B2 | | 5/2007 | Mourad et al. |
| 7,225,233 B1 | | 5/2007 | Fenton |
| 7,225,455 B2 | | 5/2007 | Bennington et al. |
| 7,228,305 B1 | | 6/2007 | Eyal et al. |
| 7,228,560 B2 | | 6/2007 | Panabaker |
| 7,340,765 B2 | | 3/2008 | Feldmeier |
| 8,490,133 B1* | | 7/2013 | Parekh ............... H04N 21/6175 725/44 |
| 8,819,134 B2 | | 8/2014 | Ham et al. |
| 2002/0133477 A1* | | 9/2002 | Abel ..................... H04H 60/61 |
| 2005/0060745 A1 | | 3/2005 | Riedl et al. |
| 2007/0192299 A1 | | 8/2007 | Zuckerberg et al. |
| 2007/0220575 A1 | | 9/2007 | Cooper et al. |
| 2007/0233879 A1* | | 10/2007 | Woods ................. G06Q 30/02 709/227 |
| 2007/0286169 A1 | | 12/2007 | Roman |
| 2009/0125377 A1 | | 5/2009 | Somji et al. |
| 2009/0144768 A1 | | 6/2009 | Nagaraja et al. |
| 2010/0030578 A1 | | 2/2010 | Siddique et al. |
| 2010/0031162 A1 | | 2/2010 | Wiser et al. |
| 2010/0064307 A1 | | 3/2010 | Malhotra et al. |
| 2010/0217670 A1 | | 8/2010 | Reis et al. |
| 2011/0125846 A1 | | 5/2011 | Ham et al. |
| 2012/0001919 A1 | | 1/2012 | Lumer |
| 2014/0324978 A1 | | 10/2014 | Ham et al. |

OTHER PUBLICATIONS

Amendment (dated Jan. 7, 2016) for U.S. Appl. No. 14/329,848, filed Jul. 11, 2014.
Final Office Action (dated May 5, 2016) for U.S. Appl. No. 14/329,848, filed Jul. 11, 2014.
Amendment (dated Jul. 5, 2016) for U.S. Appl. No. 14/329,848, filed Jul. 11, 2014.
Advisory Action (dated Aug. 10, 2016) for U.S. Appl. No. 14/329,848, filed Jul. 11, 2014.
RCE (dated Sep. 9, 2016) for U.S. Appl. No. 14/329,848, filed Jul. 11, 2014.
Office Action (dated Dec. 16, 2016) for U.S. Appl. No. 14/329,848, filed Jul. 11, 2014.
Amendment (dated Mar. 16, 2017) for U.S. Appl. No. 14/329,848, filed Jul. 11, 2014.
Notice of Allowance (dated Jun. 30, 2017) for U.S. Appl. No. 14/329,848, filed Jul. 11, 2014.
Supplemental Notice of Allowance (dated Jul. 12, 17) for U.S. Appl. No. 14/329,848, filed Jul. 11, 2014.
Office Action (dated May 8, 2012) for U.S. Appl. No. 12/949,525, filed Nov. 18, 2010.
Amendment (dated Jul. 11, 2012) for U.S. Appl. No. 12/949,525, filed Nov. 18, 2010.
Final Office Action (dated Nov. 21, 2012) for U.S. Appl. No. 12/949,525, filed Nov. 18, 2010.
RCE (dated Feb. 21, 2013) for U.S. Appl. No. 12/949,525, filed Nov. 18, 2010.
Office Action (dated Sep. 26, 2013) for U.S. Appl. No. 12/949,525, filed Nov. 18, 2010.
Amendment (dated Dec. 23, 2013) for U.S. Appl. No. 12/949,525, filed Nov. 18, 2010.
Notice of Allowance (dated Apr. 28, 2014) for U.S. Appl. No. 12/949,525, filed Nov. 18, 2010.
Corrected Notice of Allowance (dated Jul. 25, 2014) for U.S. Appl. No. 12/949,525, filed Nov. 18, 2010.

* cited by examiner

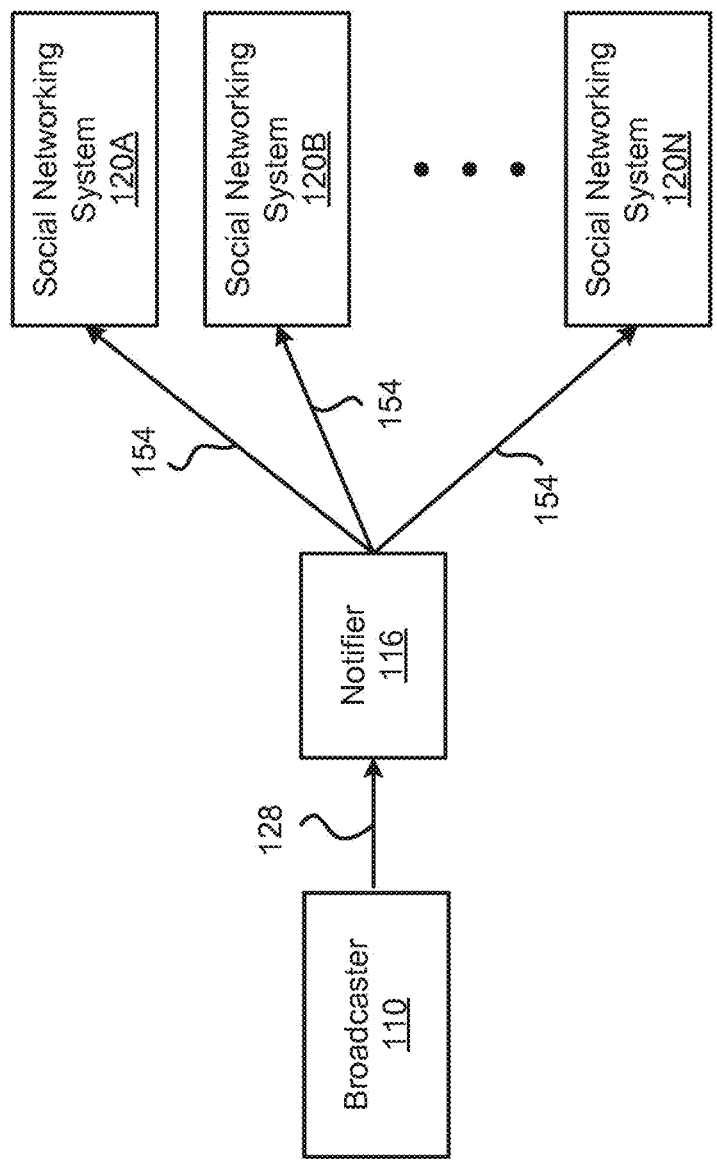

BROADCAST NOTIFICATIONS USING SOCIAL NETWORKING SYSTEMS

This application is a continuation application claiming priority to Ser. No. 14/329,848, filed Jul. 11, 2014, now U.S. Pat. No. 9,813,457, issued Nov. 7, 2017, which is a continuation of Ser. No. 12/949,525, filed Nov. 18, 2010, U.S. Pat. No. 8,819,134, issued Aug. 26, 2014, which claims priority over provisional application No. 61/263,196, filed Nov. 20, 2009.

BACKGROUND

1. Field of Art

The present invention relates to sending notifications related to broadcast streams to users via networking services such as social networking services.

2. Description of the Field of Art

With the advent to personalized broadcasting, Internet users have come to broadcast various personalized media items such as video streams and audio streams over Internet. Currently, many technology platforms allow an Internet user to broadcast media items and broadcast streams to other Internet users without expensive software or hardware. The audio or video streams broadcasted over Internet range from full-fledged commercial broadcasting to personal lifecasting that involves broadcasting of one's life.

Although some broadcast streams (e.g., commercial broadcasting) may be carefully planned or scheduled in advance, other broadcast streams (e.g., lifecasting) may be extemporaneous and random. Such extemporaneous broadcast streams may start without any prior notifications or scheduling. Hence, potential viewers or listeners may miss the extemporaneous or random broadcasting unless notifications are provided. Even for prescheduled broadcast streams, potential viewers or listeners may want to receive reminders about on-air times of the broadcast streams to make sure that they do not miss the broadcast streams. Providing notifications may be a powerful tool in increasing viewers or listeners to a broadcast stream.

Various communication mechanisms may be used to send notifications to potential viewers or listeners of the broadcast streams. Example communication channels include, among other, emails, instant messages, short message service (SMS) messages and interactive voice responses (IVR) sent over phone calls. Because it is uncertain which communication mechanisms are available to the potential viewers or listeners at a certain time, notifications may need to be sent over targeted communication channels to potential viewers or listeners to increase the likelihood that the potential viewers or listeners can tune into the broadcast streams.

SUMMARY

Embodiments relate to notifying broadcast streams to a plurality of users in a network system by using one or more agents deployed in the network system. A notifier receives a request from a broadcaster to send notifications about a broadcast streams to the users of the network system. In response, the notifier sends instructions to one or more agents deployed in the network system to send notifications about the broadcast streams to one or more users of the network system. An agent is deployed in the network system to operate as a proxy for the broadcaster. The agent establishes relationships in the network system with one or more users and sends the notifications to the users based on the preferences indicating characteristics of broadcast streams of interest to the users.

In one embodiment, the notifier deploys the agent for the broadcaster in the network system after receiving information for registration from the broadcaster. The notifier may deploy agents in multiple network systems to send notifications to users of different network systems.

In one embodiment, the notifier receives information about the broadcast stream from the broadcaster and selects a subset of users based on the preferences of the users and the information about the broadcast stream (e.g., metadata specific to the broadcast stream).

In one embodiment, the networking system provides social networking service. The agent functions as a virtual user of the social networking service that can interact with other users of the social networking system using communication channels provided by the social networking service.

In one embodiment, the notifier determines whether to recommend the broadcast stream to one or more of the users based on the preferences and relationships between the users in the network system.

BRIEF DESCRIPTION OF DRAWINGS

FIG. 1A is a conceptual diagram illustrating the registration of broadcaster in a notification system, according to one embodiment.

DETAILED DESCRIPTION

Figure 1B:
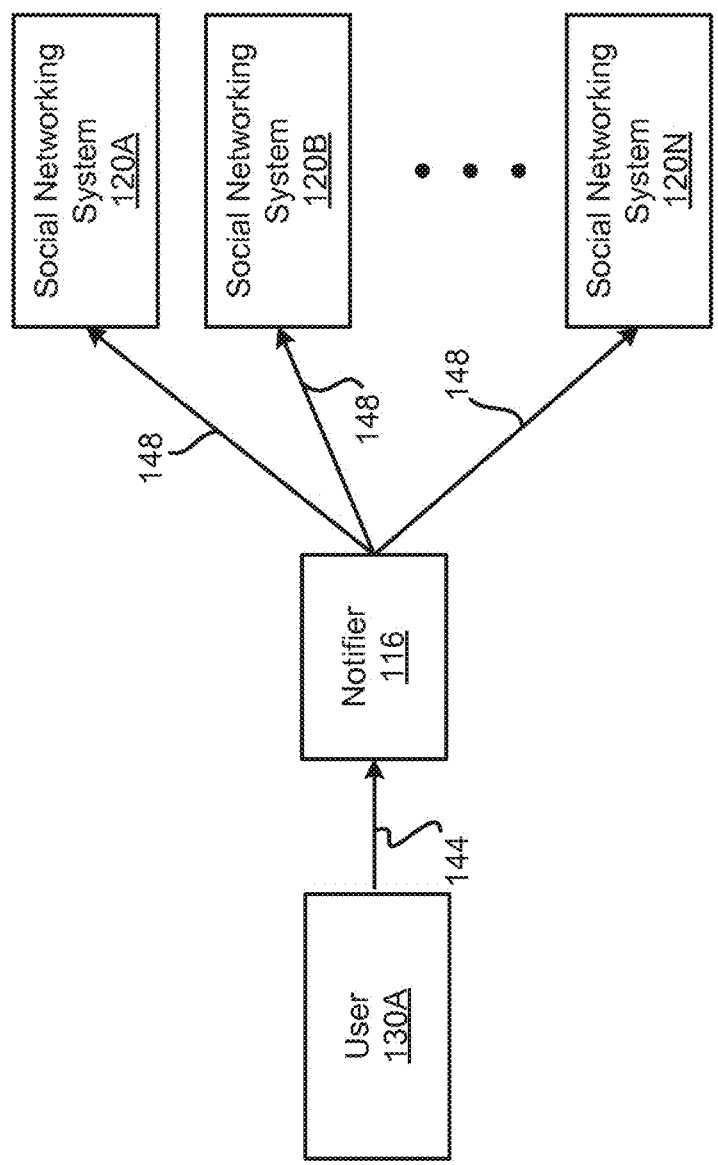
FIG. 1B is a conceptual diagram illustrating registering a user to receive notifications, according to one embodiment.

The Figures and the following description relate to preferred embodiments by way of illustration only. It should be noted that from the following discussion, alternative embodiments of the structures and methods disclosed herein will be readily recognized as viable alternatives that may be employed without departing from the principles disclosed herein.

Embodiments provide a notifier that sends out notifications to potential viewers or listeners of a broadcast stream via social networking systems or other communication channels. The notifier stores information about a user's preferences and identity on the social networking systems. After the notifier receives a notification request from a broadcaster, the notifier commands broadcaster agents deployed in the social networking systems to send notification messages to users of the social networking systems registered to receive the notification. The broadcaster agents function as a proxy that establishes relationships with users of the social networking systems and then sends out the notification messages to the users with established relationships.

A broadcast stream herein refers to a stream of content that is intended for a plurality of listeners or viewers. The broadcast stream may include, for example, a video stream, an audio stream or a combination of both.

Registration of Broadcaster in Notifier

FIG. 1A is a conceptual diagram illustrating registration of broadcaster 110 in a notification system, according to one embodiment. In order to set up for notification, broadcaster 110 sends registration information 128 for its broadcast stream at notifier 116. The registration information may include, among others, identity of the broadcaster and location (e.g., URL) at which the broadcast stream may be accessed.

In response to receiving the registration information 128 from a broadcaster, notifier 116 deploys broadcaster agents for broadcaster 110 in social networking systems 120A through 120N (hereinafter collectively referred to as the "social networking systems 120"). Examples of social networking systems 120 include, for example, Facebook, MySpace, Twitter and LinkedIn.

In one embodiment, the broadcaster agent is software installed in the social networking systems 120 to function as a proxy for registered broadcaster 110. In another embodiment, the broadcaster agent is software, firmware, hardware or a combination thereof that is separated from the social networking systems 120. In this embodiment, the broadcaster agent communicates with the social networking system 120 over a network to function as a proxy for registered broadcaster 110. The broadcaster agents send notifications to selected users of the social networking systems 120 according to instructions 154 received from notifier 116, as described below in detail with reference to FIG. 3.

Notifier 116 is software, firmware, hardware or a combination thereof for controlling the broadcaster agents in the social networking systems 120. Specifically, notifier 116 sends instructions 154 commanding broadcaster agents to establish relationships with the users and send notifications to the users via the social networking systems 120. Notifier 116 may also perform data mining and pattern analysis to recommend broadcast streams for users not registered to receive the notification. In one embodiment, notifier 116 is a component separate from the social networking systems 120. In another embodiment, notifier 116 is part of a social networking system 120. An example of notifier 116 is described below in detail with reference to FIG. 2.

In one embodiment, broadcaster 110 also provides information about the characteristics of the broadcast streams to notifier 116. The characteristics of broadcast streams may include, for example, genre of broadcast streams, on-air times of the broadcast streams, the resolution of broadcast streams (e.g., high definition or low definition streams), likely viewers or listeners of the broadcast streams, the geographic location where the broadcast stream is generated, and the spoken language in the broadcast streams. Such characteristics of the broadcast streams are stored in notifier 116 and may be used for selecting broadcast streams for recommendation to users.

A social networking system 120 is hardware, software, firmware or a combination thereof for storing a social network or a social graph representing relationships between a plurality of users and enabling users to communicate and interact with each other. In use, users join the social networking system 120 and then add i.e., relationships to a number of other users of the social networking system 120 to whom they desire to be connected. Connections may be added explicitly by a user or may be automatically created by the social networking systems 120 based on common characteristics of the users (e.g., users who are alumni of the same educational institution).

Registration of Users in Notifier

FIG. 1B is a conceptual diagram illustrating registering user 130A to receive notifications, according to one embodiment. User 130A is a potential viewer or listener who desires to track broadcast streams sent out by a broadcaster. User 130A registers for notifications generated and provided by notifier 116. To register at notifier 116, user 130A provides information 114 including identities (IDs) of user 130A at one or more social networking systems 120. After notifier 116 collects information 144 from user 130A, notifier 116 sends commands 148 to one or more broadcaster agents deployed in the social networking systems 120 to establish relationships with user 130A in the social networking systems 120. The relationship between the broadcaster agent and user 130A is similar to what is referred to as "friends," "followers" or "contacts" between human users but differ in the sense that a party is a non-human entity.

In one embodiment, information 114 includes user preferences associated with notification. The user preferences may include, among others, at which time and by which social networking systems 120 the user 130A should be notified. By setting preferences, user 130A may receive notifications about broadcast streams in a manner convenient to user 130A. Other preferences that user 130A may provide include, among others, types of broadcast streams that user 130A wants to be notified of, whether to schedule an event or record the broadcast stream when the broadcast stream goes live, keywords associated with preferred broadcast streams, geological location of the users, and notification based on whether other users in a social networking system is viewing or listening to the broadcast stream.

In one embodiment, the user preferences may indicate the identity of certain individuals or entities that the user is following. For example, the user may indicate the user's favorite celebrity in the preferences. In response, notifier 116 may register the user as "follower" of the celebrity and instruct broadcaster agents assigned to the celebrity to establish relationships with the user. After the relationships are established, the user can receive notifications related to the celebrity's broadcast via social networking system.

In one embodiment, the broadcaster is embodied as a software algorithm executable by a processor of a computer system. Such algorithm is configured to simulate human users in the social networking systems 120. The broadcaster agents can take advantage of functionality provided by social networking systems to establish relationships with registering users.

Sending Notifications to Users

Figure 1C:
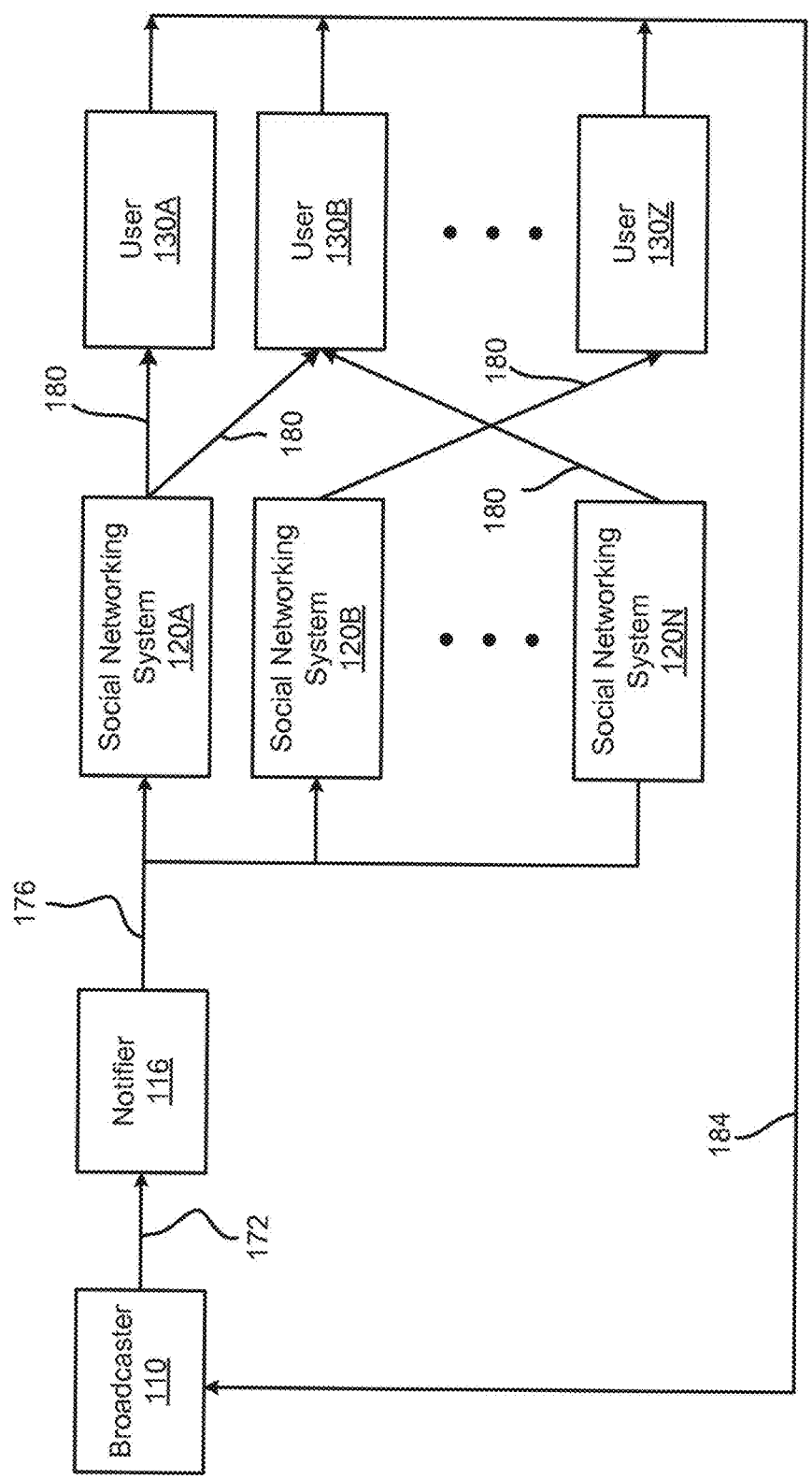
FIG. 1C is a conceptual diagram of sending notifications to users by the notification system, according to one embodiment.

FIG. 1C is a conceptual diagram of sending notifications to users by the notification system, according to one embodiment. As broadcaster 110 prepares or starts to broadcast a stream over a network (e.g., Internet), broadcaster 110 sends a request 172 to notifier 116 to notify pending or active broadcast streams to users. In response, notifier 116 sends out commands 176 to the broadcaster agents in the social networking systems 120 to propagate notifications 180 to users registered to receive notifications about the broadcast streams, according to the preferences set by the users.

The broadcaster agents in the social networking system 120 has relationships established with users 130A through 130Z by the registration process, as described above with reference to FIG. 1B. The broadcaster agents in the social networking system 120 receive commands 176 from notifier 116 and send notification messages 180 to users 130A through 130Z. Users 130A through 130Z may receive notification messages 180 from one or more social networking systems 120 based on user preferences.

In another embodiment, the broadcaster agents may reside in notifier 116. The broadcaster agents in notifier 116 commands and sends notifications to users 130 via the social networking systems 120 by acting as another user. The broadcaster agents may login to the social networking systems 120 as if it was a user, and perform various operations (e.g., establish relationship with users 130 and/or send notifications to users 130).

Broadcaster 110 may propagate notifications to multiple users conveniently by sending a request to notifier 116. That is, broadcaster 110 need not send notification messages 180 to users 130A though 130Z individually. In one embodiment, notifier 116 is included in a broadcasting platform used by broadcasters for broadcasting streams. By using notifier 116, broadcaster 110 is relieved of the task to notify multiple users 130 individually and the need or cost to set up or maintain a system for notifying individual users.

The notification messages 180 sent to users 130 of the social networking systems 120 may include, among others, (i) notifications for a live unscheduled broadcast stream when the broadcast stream starts, (ii) notifications for a live scheduled broadcast stream sent before a predetermined amount of time (e.g., 30 minutes), and (iii) notifications for a non-live recorded broadcast stream.

In one embodiment, notifier 116 may also access other communication channels such as instant messengers (e.g., AIM, Gtalk, ICQ, MSN or Yahoo Messenger) or emails services to send notifications to the user in addition to sending notifications via social networking systems. In this case, broadcaster agents may reside in instant messenger systems or email systems to send notifications pursuant to commands from notifier 116.

Based on the notifications 180 received from the social networking systems 120, users 130 can send access requests 184 to access the notified broadcast streams provided by broadcaster 110. For example, the notifications 180 may include hyperlinks that forward the users 130 to a broadcast streams associated with the notifications when the hyperlinks are clicked.

Example Architecture of Notifier

Figure 2:
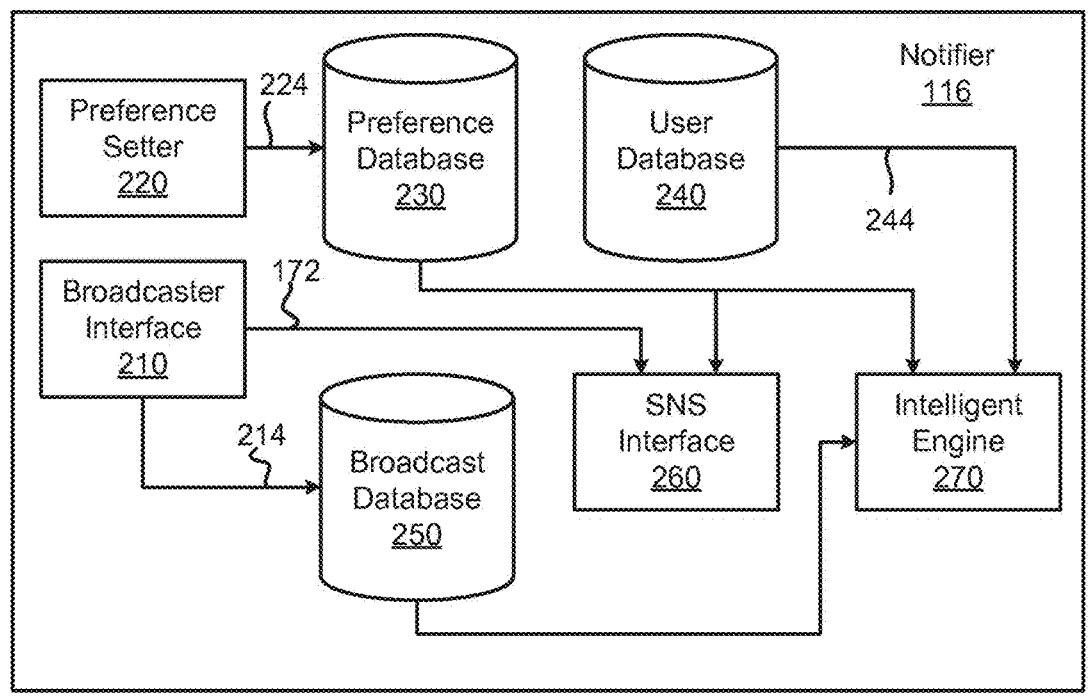
FIG. 2 is a block diagram illustrating a notifier, according to one embodiment.

FIG. 2 is a block diagram illustrating notifier 116 according to one embodiment. Notifier 116 includes, among other components, broadcaster interface 210, preference setter 220, preference database 230, user database 240, broadcast database 250, social networking system (SNS) interface 260, and intelligent engine 270. One or more of the components in notifier 116 may be implemented in hardware, software, firmware or any combinations thereof. Further, two or more components of notifier 116 may be combined into a single hardware, software or firmware module.

Broadcaster interface 210 communicates with broadcaster 110 to receive, among others, the following information: (i) identity of broadcast streams and their locations in a network (e.g., URL), (ii) information indicating characteristics (e.g., genre and geographic location of the source) of broadcast streams, (iii) on-air times of the broadcast streams. (iv) pre-recorded broadcast streams, and (v) information on quality (e.g., hi-definition) of the broadcast streams. The information 214 received from the broadcaster 110 is stored in broadcast database 250.

Preference setter 220 receives user preferences from users 130 and stores the user preferences 224 in preference database 230. The user preferences 224 may indicate, for example, (i) user's preferred social networking systems 120 for receiving notification depending on various conditions (e.g., notification by social networking system A in the morning, and notification by social networking system B in the afternoon), (ii) desired time at which the user should be notified (e.g., 30 minutes before the broadcast stream goes live), (iii) communication channels (e.g., emails or instant messages) other than social networking systems 120 that may be used to notify the users, (iv) the frequency of reminders about broadcast streams, (v) times at which the user should not be notified (e.g., at night), (vi) whether the notification should be sent to multiple social networking systems simultaneously or in sequence with time intervals, (vii) user's interest, and (viii) information associated with user's use of social networking systems. Various other preferences may also be received and stored depending on a user's pattern of social networking systems usage.

Preference database 230 stores the user preferences received via the preference setter 220. The user preferences stored in preference database 230 may be accessed by SNS interface 260 and intelligent engine 270, as described below in detail.

User database 240 stores user profiles of users registered to receive notification about broadcast streams. The user profiles may be provided by the users, broadcasters, and/or social networking systems 120. In one embodiment, the user database 240 is connected to SNS interface 260 to receive and store relationships between users in the social networking systems 120. The relationships 244 between the users of the social networking systems 120 may be processed by intelligent engine 270 to analyze, predict and extract various patterns useful for notifications.

Broadcast database 250 is connected to the broadcaster interface 210 to receive and store characteristics of broadcast streams.

SNS interface 260 communicates with social networking systems 120 to perform one or more of the following functions: (i) send commands to the broadcaster agents deployed in the social networking systems 120, (ii) collect information about relationships between users of the social networking systems 120, and (iii) receive information about users' accessing of the broadcast streams via the social networking systems 120. SNS interface 260 may receive requests 172 for notifications extracted at the broadcast interface 210.

Intelligent engine 270 is connected to preference database 230, user database 240 and broadcast database 250 to analyze, predict and extract viewing or listing patterns of viewers or listeners. In one embodiment, the intelligent engine 270 analyzes information available in preference database 230, user database 240 and broadcast database 250 to recommend broadcast streams to the users. The analyzed information may also be used for providing more interesting broadcast streams, provide insight into trends of users' interest, and assist broadcasters to allocate resources for multiple broadcast streams.

To recommend broadcast streams to the users, the intelligent engine 270 may consider, for example, (i) preferences of the users (e.g., a user's favorite genre of movies), (ii) profiles (e.g., age or gender) of users, (iii) broadcast streams accessed by other users of similar profiles, (iv) broadcast streams accessed by other users having relationships in the social networking systems 120, (v) geographic location of the broadcasters and the users, (vii) popularity of the broadcast stream, (viii) trends in the change of viewers of broadcast streams, (ix) feedback or editorial contents related to the broadcast streams, and (x) advertisements associated with the broadcast streams. In one embodiment, the intelligent engine 270 may receive information associated with trends or changing popularity of the broadcast streams from third party entities such social networking systems or other online services. Intelligent engine 270 may execute data mining algorithms or statistical analysis algorithm to correlate these factors and a user's activities (e.g., registration for notification or accessing of certain broadcast streams) to generate a list of broadcast streams that may be of interest to the user.

If intelligent engine 270 determines that a number of users having profiles similar to a particular user or a number of users having relationship with a particular user have registered for notification of a broadcast stream or currently accessing the broadcast stream, the intelligent engine 270 may recommend the same broadcast stream to the particular user. The recommended broadcast streams may be included in a notification for broadcast streams that the particular user expressly indicated interest. Alternatively, a message including recommended broadcast streams may be sent out to users separate from the notifications.

Users having relationships in the social networking systems 120 tend to share interest or some characteristics. Hence, a broadcast stream of interest to a particular user is also likely to be of interest to another user having a relationship with the particular user. By accessing the relationships stored in the user database 240, the intelligent engine 270 can make recommendations that are more relevant to the users.

Example Social Networking System

Figure 3:
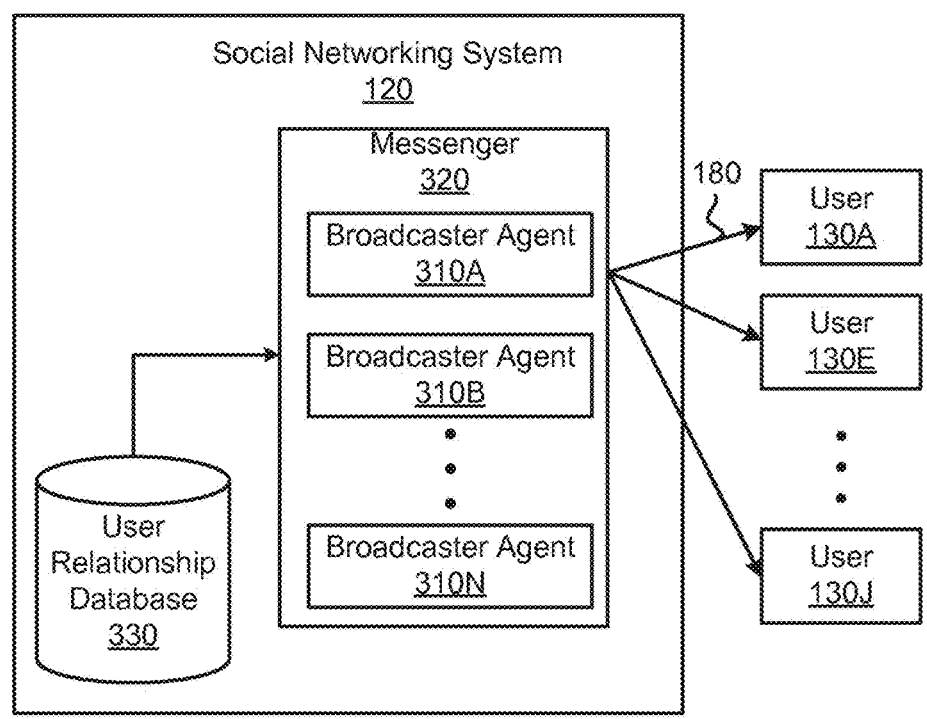
FIG. 3 is a diagram illustrating a social networking system interacting with multiple users, according to one embodiment.

FIG. 3 is a diagram illustrating social networking system 120 interacting with multiple users 130A through 130J, according to one embodiment. Social networking system 120 may include, among other components, a messenger 320, and user relationship database 330. The messenger 320 is associated with sending messages to or from users 130. The messenger 320 includes broadcaster agents 310A through 310N (hereinafter referred to as "broadcaster agents 310"). Each of broadcaster agents 310 functions as a proxy of a broadcaster. In one embodiment, the broadcaster agents 310 may interact with other components of the social networking system 120 in the same manner as a human user would. In this way, social networking systems 120 can support notification services with only minimal modifications. Broadcaster agents 310 receive commands 176 from notifier 116 to send notifications 180 to selected users 130 according to preferences set by the users.

User relationship database 330 stores the relationships between users 130 and broadcaster agents 310. The relationships are sometimes referred to and represented as "social graphs." Such social graphs are generally open to public for access in social networking systems 120. As set forth above with reference to FIG. 2, SNS interface 260 may retrieve the social graphs of users 130 and store the social graphs in user database 240. Alternatively, broadcaster 110 or other entities may provide the social graphs for storage in user relationship database 330.

Messenger 320 is software, hardware, firmware or any combinations thereof for sending notifications to users 130. Messenger 320 is a component of social networking system 120 that allows users 130 and broadcaster agents 310 to exchange messages or publish information for access by users 130. Messenger 320 may be embodied, for example, as an email exchange system, an instant messaging system, a short message service (SMS) system, and a newsfeed generator for publishing a user's activities or input.

Example Embodiment of Notifier and Social Networking System

Figure 4:
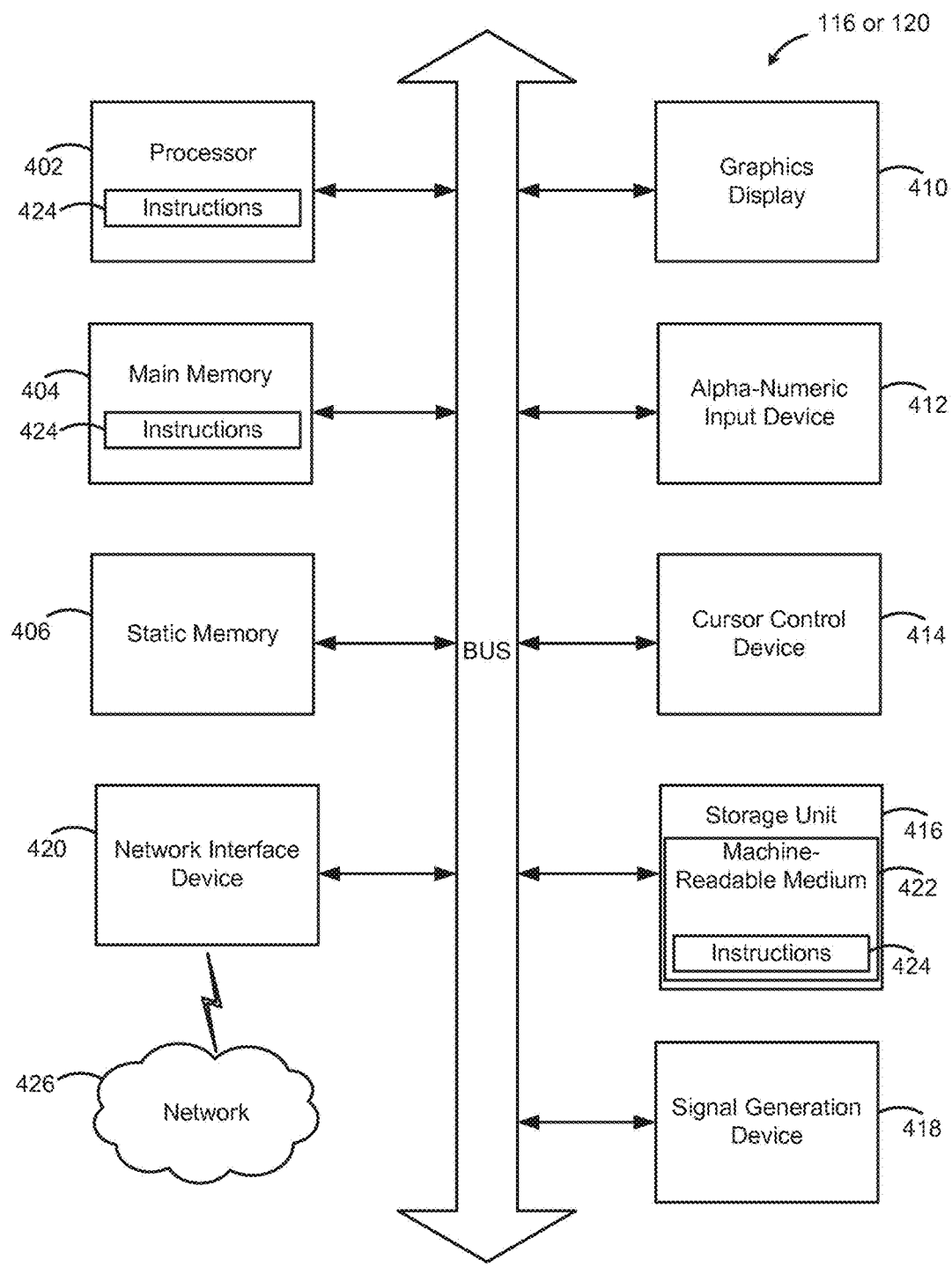
FIG. 4 is a block diagram illustrating a notifier or a social networking system embodied in a computing device, according to one embodiment.

FIG. 4 is a block diagram illustrating notifier 116 or social networking system 120 embodied in a computing device, according to one embodiment.

Specifically, FIG. 4 shows a diagrammatic representation of notifier 116 or social networking system 120 in the example form of a computer system within which instructions 424 (e.g., software) for causing notifier 116 or social networking system 120 to perform any one or more of the methodologies discussed above may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

Notifier 116 or social networking system 120 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed above.

Example notifier 116 or social networking system 120 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus. Notifier 116 or social networking system 120 may further include graphics display unit 410 (e.g., a plasma display panel (PDP), a liquid crystal display (LCD), a projector, or a cathode ray tube (CRT)). Notifier 116 or social networking system 120 may also include alphanumeric input device 412 (e.g., a keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus.

Storage unit 416 includes a machine-readable medium 422 on which is stored instructions 424 (e.g., software) embodying any one or more of the methodologies or functions described above. Instructions 424 (e.g., software) may also reside, completely or at least partially, within main memory 404 or within processor 402 (e.g., within a processor's cache memory) during execution thereof by notifier 116 or social networking system 120, main memory 404 and processor 402 also constituting machine-readable media. Instructions 424 (e.g., software) may be transmitted or received over a network 426 via network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Example Operation of Notification System

In one embodiment, after a user receives a notification 180 via messenger 320, the user can act on the notification 180 to access a broadcast stream. For example, a user may click on a link (e.g., http://ustre.am/ABCD) provided in the notification message. By clicking the link, the user is directed to a location in a network where the broadcast stream can be accessed. The broadcast stream may reside on a web server operated by the social networking systems 120, the broadcaster 110 or an independent service provider.

In one embodiment, when the user acts on the notification, a message is generated and sent to notifier 116 indicating that the user is viewing or listening to the broadcast stream. The notification message includes a hyperlink that includes information about the location (e.g., URL) of the broadcast stream and identity of the user. The following is an example of an URL for the broadcast stream:

http://www.ustre.am/ABCD where "www.stre.am" indicates domain name of a server for decoding the string of characters "ABCD" into a converted URL. For example, the server with domain name www.stre.am decodes "ABCD" into the following URL:

http://www.ustream.tv/channel/aplusk-live#SNS=1&user=1234 where "aplusk-live" represents the identity of the broadcast stream, "SNS1" indicates the social networking system from which the user was directed from, and "user=1234" represents an encrypted hash of a user ID. After a web server or other network components mapped to domain name "www.ustream.tv" receives the request associated with the converted URL, the web server or the other network components send a message to notifier 116 and/or broadcaster 110 indicating that a user of social networking system 1 corresponding to encrypted hash 1234 has requested access to the broadcast stream and is currently listening to or viewing the broadcast stream. By referencing user ID and social networking system identifier in user database 240, notifier 116 can determine which user is viewing or listening to the broadcast streams.

Information about users viewing or listing to broadcast streams may be collected, stored and processed by intelligent engine 270 of notifier 116 to extract patterns or predict user's interest in a broadcast stream, as described above in detail with reference to FIG. 2.

In one embodiment, after notifier 116 receives indication that a particular user has requested access to a broadcast stream and is currently listening to or viewing the broadcast stream, notifier 116 may cause social networking systems 120 to send out follow-up notifications or alerts to other users having relationships with the particular user. The follow-up notifications or alerts notify the other users that the particular user is accessing the broadcast stream, and suggest watching or listening to the same broadcast stream. In this way, associated users of the social networking systems 120 may share the experience of viewing or listening to the same broadcast stream and increase the chance to interact with each other. The follow-up notification/alert feature may be disabled by setting the preferences in notifier 116.

In one embodiment, notifier 116 sends out the follow-up notifications or alerts to a target user not currently viewing or listening to the broadcast stream responsive to the number of users or the percentage of users having relationship with the target user viewing or listing to the broadcast stream reaching a predetermined threshold.

Example Method of Notifying Broadcast Stream

Figure 5:
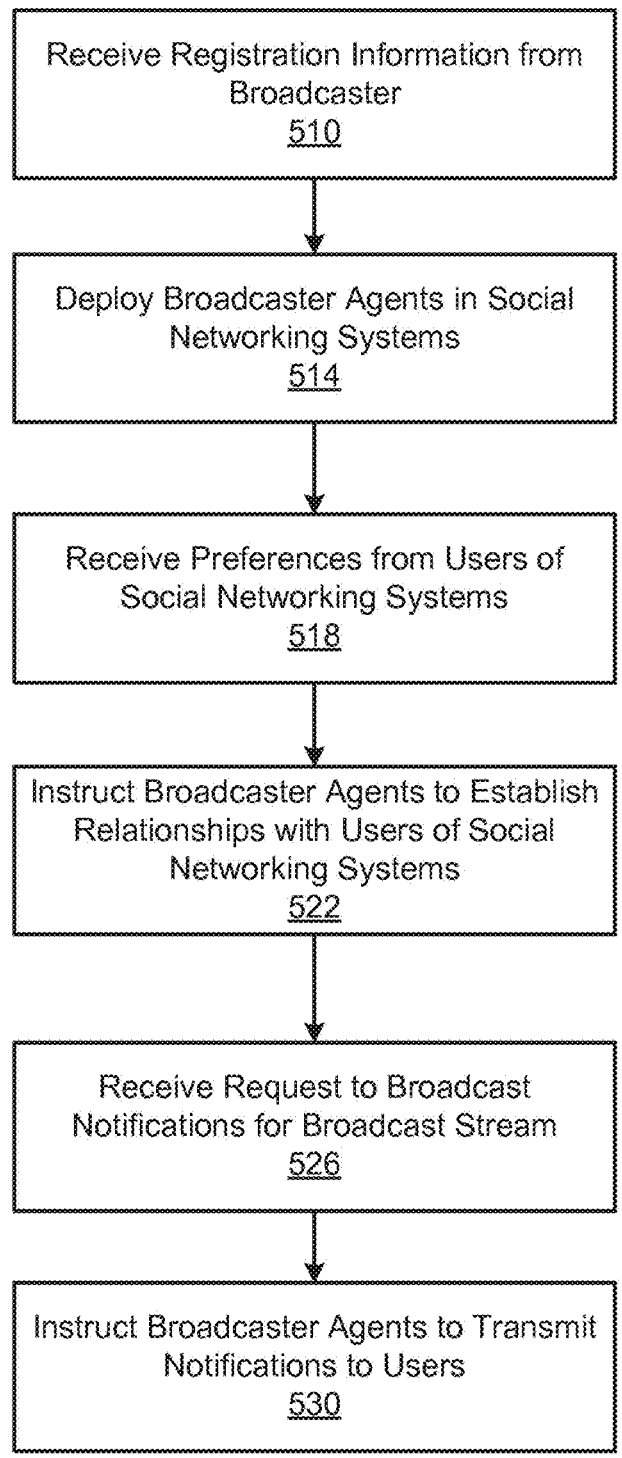
FIG. 5 is a flowchart illustrating processes for sending notifications to users via the social networking system, according to one embodiment.

FIG. 5 is a flowchart illustrating processes for sending notifications to users 130 via social networking systems 120, according to one embodiment. Notifier 116 receives registration information 128 from broadcaster 110. The registration information 128 may include, among others, identity of the broadcaster and location (e.g., URL) at which the broadcast stream may be accessed. Then, notifier 116 deploys 514 broadcaster agents for broadcaster 110 in social networking systems 120.

Notifier 116 also receives 518 preferences from users 130 of the social networking systems 120. The preferences may indicate at which time and by which social networking systems 120 the user should be notified.

Notifier 116 instructs 522 broadcaster agents 310 in social networking systems 120 to establish relationships with the users of the social networking system 120 based on the users' preferences. By establishing the relationships, notifications may be sent to the users by notifier 116 via communication channels in social networking systems 120.

Notifier 116 receives 526 a request 172 to notify pending or active broadcast streams to users 130. In response, notifier 116 instructs 530 broadcaster agents 310 to transmit notifications about pending or active broadcast streams to users 130.

The sequence and processes illustrated in FIG. 5 are merely illustrative. For example, receiving 510 registration information from a broadcaster and deploying 514 broadcaster agents 310 in social networking systems 120 may be performed after receiving 518 preferences from users 130.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, as illustrated and described with FIGS. 1A-C and 2-5. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a system and a process for notifying broadcast streams through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for notifying broadcast streams to a plurality of users, said method comprising:
   receiving, by a notifier via one or more processors of a notification system, a request to notify a broadcast stream from a broadcaster;
   receiving, by the notifier via the one or more processors, preferences from a subset of users of a plurality of social networking systems, said preferences identifying: (i) some but not all social networking systems of the plurality of social networking systems which should send notifications about the broadcast stream to the subset of users; and (ii) times during which the notifications about the broadcast stream should be sent to the subset of users;
   instructing, by the notifier via the one or more processors, an agent representing a broadcaster in each social networking system of only said some social networking systems to send notifications about the broadcast stream to the subset of users at the times identified in the preferences; and
   in response to said instructing, said agent representing a broadcaster in each social networking system sending, via the one or more processors, notifications about the broadcast stream to the subset of users at the times identified in the preferences.

2. The method of claim 1, said method further comprising:
   receiving, by the notifier via the one or more processors, registration information for registering the broadcaster, wherein the agents are deployed in response to said receiving the registration information for registering the broadcaster.

3. The method of claim 1, said method further comprising:
   receiving, by the notifier via the one or more processors, information about the broadcast stream from the broadcaster; and
   selecting, by the notifier via the one or more processors, the subset of users based on the preferences and the information about the broadcast stream.

4. The method of claim 1, said method further comprising:
   selecting, by the notifier via the one or more processors, the subset of users to receive the notifications about the broadcast stream based on the preferences.

5. The method of claim 1, wherein the preferences include one or more of (i) a manner convenient for receiving the notification, (ii) types of broadcast streams of interest, (iii) whether to schedule an event or record the broadcast stream when the broadcast stream becomes active, (iv) keywords associated with preferred broadcast streams, (v) geological location of the subset of users, and (vi) receiving of a notification based on whether other users in a social networking system is viewing or listening to the broadcast stream.

6. The method of claim 1, wherein the notifications include a link for accessing the broadcast stream.

7. The method of claim 1, said method further comprising:
   determining, by the notifier via the one or more processors, whether to recommend the broadcast stream to one or more users of the subset of users based on the preferences and relationships between the users of the subset of users.

8. A notification system, comprising one or more processors and a memory coupled to the one or more processors, said memory storing instructions which, upon being executed by the one or more processors, cause the one or more processors to perform a method for notifying broadcast streams to a plurality of users, said method comprising:
   receiving, by a notifier via the one or more processors, a request to notify a broadcast stream from a broadcaster;
   receiving, by the notifier via the one or more processors, preferences from a subset of users of a plurality of social networking systems, said preferences identifying: (i) some but not all social networking systems of the plurality of social networking systems which should send notifications about the broadcast stream to the subset of users; and (ii) times during which the notifications about the broadcast stream should be sent to the subset of users;
   instructing, by the notifier via the one or more processors, an agent representing a broadcaster in each social networking system of only said some social networking systems to send notifications about the broadcast stream to the subset of users at the times identified in the preferences; and
   in response to said instructing, said agent representing a broadcaster in each social networking system sending, via the one or more processors, notifications about the broadcast stream to the subset of users at the times identified in the preferences.

9. The notification system of claim 8, said method further comprising:
   receiving, by the notifier via the one or more processors, registration information for registering the broadcaster, wherein the agents are deployed in response to said receiving the registration information for registering the broadcaster.

10. The notification system of claim 8, said method further comprising:
    receiving, by the notifier via the one or more processors, information about the broadcast stream from the broadcaster; and
    selecting, by the notifier via the one or more processors, the subset of users based on the preferences and the information about the broadcast stream.

11. The notification system of claim 8, said method further comprising:
    selecting, by the notifier via the one or more processors, the subset of users to receive the notifications about the broadcast stream based on the preferences.

12. The notification system of claim 8, wherein the preferences include one or more of (i) a manner convenient for receiving the notification, (ii) types of broadcast streams of interest, (iii) whether to schedule an event or record the broadcast stream when the broadcast stream becomes active, (iv) keywords associated with preferred broadcast streams, (v) geological location of the subset of users, and (vi) receiving of a notification based on whether other users in a social networking system is viewing or listening to the broadcast stream.

13. The notification system of claim 8, wherein the notifications include a link for accessing the broadcast stream.

14. The notification system of claim 8, said method further comprising:
    determining, by the notifier via the one or more processors, whether to recommend the broadcast stream to one or more users of the subset of users based on the preferences and relationships between the users of the subset of users.

15. A non-transitory computer-readable storage medium storing instructions which, upon being executed by one or more processors of a notification system, cause the one or more processors to perform a method for notifying broadcast streams to a plurality of users, said method comprising:

receiving, by a notifier via the one or more processors, a request to notify a broadcast stream from a broadcaster;

receiving, by the notifier via the one or more processors, preferences from a subset of users of a plurality of social networking systems, said preferences identifying: (i) some but not all social networking systems of the plurality of social networking systems which should send notifications about the broadcast stream to the subset of users; and (ii) times during which the notifications about the broadcast stream should be sent to the subset of users;

instructing, by the notifier via the one or more processors, an agent representing a broadcaster in each social networking system of only said some social networking systems to send notifications about the broadcast stream to the subset of users at the times identified in the preferences; and in response to said instructing, said agent representing a broadcaster in each social networking system sending, via the one or more processors, notifications about the broadcast stream to the subset of users at the times identified in the preferences.

16. The computer-readable storage medium of claim 15, said method further comprising:

receiving, by the notifier via the one or more processors, registration information for registering the broadcaster, wherein the agents are deployed in response to said receiving the registration information for registering the broadcaster.

17. The computer-readable storage medium of claim 15, said method further comprising:

receiving, by the notifier via the one or more processors, information about the broadcast stream from the broadcaster; and selecting, by the notifier via the one or more processors, the subset of users based on the preferences and the information about the broadcast stream.

18. The computer-readable storage medium of claim 15, said method further comprising:

selecting, by the notifier via the one or more processors, the subset of users to receive the notifications about the broadcast stream based on the preferences.

19. The computer-readable storage medium of claim 15, wherein the preferences include one or more of (i) a manner convenient for receiving the notification, (ii) types of broadcast streams of interest, (iii) whether to schedule an event or record the broadcast stream when the broadcast stream becomes active, (iv) keywords associated with preferred broadcast streams, (v) geological location of the subset of users, and (vi) receiving of a notification based on whether other users in a social networking system is viewing or listening to the broadcast stream.

20. The computer-readable storage medium of claim 15, wherein the notifications include a link for accessing the broadcast stream.

* * * * *